UNITED STATES PATENT OFFICE.

WILLIAM R. PALMER, OF BRIDGEPORT, CONNECTICUT, ASSIGNOR OF ONE-HALF TO FRANK A. WILMOT, OF BRIDGEPORT, CONNECTICUT.

PROCESS OF PRODUCING HIGH-GRADE STEEL FROM LOW-GRADE MATERIAL.

No. 924,818.  Specification of Letters Patent.  Patented June 15, 1909.

Application filed March 5, 1909. Serial No. 481,424.

*To all whom it may concern:*

Be it known that I, WILLIAM R. PALMER, a citizen of the United States, residing at Bridgeport, in the county of Fairfield and State of Connecticut, have invented certain new and useful Improvements in Processes of Producing High-Grade Steel from Low-Grade Material; and I do hereby declare the following to be a full, clear, and exact description of the invention, such as will enable others skilled in the art to which it appertains to make and use the same.

In basic open-hearth steel making it has heretofore been necessary to use for a considerable portion of the charge steel making pig iron commercially known either as basic, or off-basic or Bessemer pig, the basic pig not exceeding one per cent. in silicon and the off-basic or Bessemer pig not exceeding one and one-fourth per cent. in silicon, whereas foundry pig iron from which castings and cast iron borings are produced exceeds both basic and off-basic pig in silicon, phosphorus and sulfur and its scrap makes too acid a bath to permit of any considerable portion of the scrap being used in basic open-hearth furnaces because of the acid bath attacking the basic lining of the furnace at steel making temperatures, the silicon being particularly active in attacking the basic lining.

The ordinary process of making basic open-hearth steel consists in charging a furnace with pig iron and scrap together with the necessary flux and then melting and working this charge to the desired chemical composition and temperature. The flux, ordinarily limestone, forms a slag which absorbs and retains the impurities, silicon, sulfur and phosphorus, to a greater or less extent dependent on the basic qualities of the slag so formed, thereby purifying the metal. Simultaneously, however, with the oxidation of the impurities the carbon also is partially oxidized and the furnace must be charged with sufficient carbon in some form to cover this loss by oxidation and to insure sufficient carbon remaining in the bath after the metallic charge is melted. This required carbon is generally contained in the pig iron and the furnace must therefore be charged with sufficient pig iron to impart the necessary amount of carbon to the bath. As pig iron is the most expensive portion of the charge, the addition of the necessary amount of pig iron greatly increases the cost of the steel.

My present invention enables me to greatly reduce the cost of production of high grade steel. This I accomplish by using in lieu of pig iron, materials that are commercially worth one-half, more or less, the cost of pig iron, as for example cast iron borings, large pieces of castings, cast scrap and other low grade material which cannot be used in any appreciable quantity in the ordinary open-hearth process on account of the high percentage of impurities they contain. Cast iron borings are of somewhat similar composition to pig iron but cannot be used in the ordinary process of making basic open-hearth steel for the reason that the percentage of silicon in cast iron borings is so much higher than in basic pig iron as to cause the destruction or scorification of the furnace hearth, and the neutralizing and destroying of the basic effect of the limestone and interfering with the removal of the other impurities. The percentage of sulfur is also much higher in cast iron borings than in pig iron owing to the absorption of sulfur from the fuels in former meltings. Sulfur in fact is the most difficult impurity to remove or oxidize from the bath, and if not removed or oxidized greatly decreases the quality and value of the steel. Still another reason why cast iron borings cannot be used in the ordinary open-hearth process of making steel is their physical condition, they being finely granular or powdered, which renders them unfit for use in appreciable quantity in the ordinary open hearth process as this condition interferes with the melting, the material lying in such a close mass that the heat will not penetrate and long delayed melting results from the use of any appreciable quantity of borings in this process. The same is true both as regards the physical and chemical composition of large castings or chunks or large pieces of cast iron. With this description of the low grade materials which I may use in carrying out my novel process and the physical and chemical characteristics thereof it will be sufficient to refer to them generically as low grade material.

In carrying out my invention I use two or more open-hearth furnaces, the first of which I call the primary furnace and the other or others secondary or finishing furnaces, for the reason that a single primary furnace will keep from two to four secondary furnaces running, depending of course upon the size of the furnaces. The primary furnace I run at what is relatively a low temperature in steel making, for example at a temperature one thousand degrees Fahrenheit, more or less, below the ordinary temperatures of steel making. The secondary furnace or furnaces are run at ordinary steel-making temperatures. The running of the primary furnace at a relatively low temperature prevents any appreciable attack of the silicon on the basic lining of the furnace and also partially eliminates the silicon, phosphorus and sulfur. From this primary furnace I tap for use in the secondary furnace a molten metal representing in analysis a semi-pig or semi-steel, it being refined as to silicon, phosphorus and sulfur to about one-half of the percentage of these elements contained in basic pig iron, the further refinement at steel-making temperatures being accomplished in the secondary furnace. Both the primary furnace and the secondary furnace or furnaces may be of the stationary type. In starting, the primary furnace is charged with pig iron or with large chunks or pieces of cast iron to form a liquid bath of iron to which is added sufficient flux to cover the metal and to partially oxidize the impurities at the same time preventing oxidation of the metal. It should be noted that this is done only in starting the primary furnace, as thereafter sufficient metal is returned to it to form a molten bath. After the bath is so formed the low grade material as already defined either as metallic iron or iron oxids, is added in such quantities and as rapidly as the melting will permit together with the required amount of flux in the shape of limestone or other materials cold or in the shape of fluid slag from one of the finishing furnaces, as will be more fully explained. The secondary or finishing furnace is partially charged with any suitable low grade material as scrap and a sufficient quantity of flux and when the heated metal is in a semi-molten condition it is ready for the molten metal from the primary furnace.

In transferring the molten metal from the primary furnace to a secondary furnace, if the secondary furnace is at a low enough level, the molten metal in the primary furnace may be tapped into a trough at sufficient incline to permit it to flow into the secondary furnace. This arrangement is not common, however, with furnaces already in use. Ordinarily in transferring the metal from the primary furnace to a secondary furnace, I use a ladle which is provided with two tap holes and is handled by a crane. The lower tap hole is placed at the side of the ladle in line with the bottom thereof and the upper tap hole is situated at such a distance above the lower hole as will permit the amount of metal desired to be returned to the primary furnace to be retained in the ladle for this purpose.

Suppose now that the charge in the primary furnace is ready for tapping and the partial charge in the secondary furnace has been brought to a suitable condition. The metal from the primary furnace is now tapped into the ladle which is transferred by a crane to the secondary furnace, the plug in the upper tap hole is removed and the molten metal allowed to flow into the secondary furnace. When the desired amount of molten metal has been delivered to the secondary furnace, the tap hole in the ladle is plugged and the remaining molten and partially refined metal is returned to the primary furnace and is tapped from the bottom hole in the ladle into it. This molten metal returned to the primary furnace forms a bath which facilitates and hastens the melting of the next charge of low grade material, which may be placed in the furnace either before or after the molten metal is tapped into it from the ladle. The slag from the primary furnace having lost its efficiency is not allowed to flow into the secondary furnace nor returned to the primary furnace, but is otherwise disposed of. The efficiency of the slag from the secondary furnace however has been only partially impaired by the operation of said furnace. When the charge in the secondary furnace has reached the proper condition, it is drawn off in the usual manner. The slag from the secondary furnace however may or may not be run into the ladle after the tapping of the heat of steel and delivered to the primary furnace to assist in the working of the charge therein. This charge of molten slag from the secondary furnace assists to a certain extent in the working of the charge in the primary furnace and also acts to partially remove and retain the impurities from the charge in the primary furnace. As the slag is charged in a molten condition, there is no cooling effect produced by it, and no retarding of the work at the primary furnace. The charging of the slag from the secondary furnace into the primary furnace has this further beneficial effect of immediately protecting the metal from oxidation and protecting the furnace bottom from scorification. As it is already formed the loss of carbon resulting from the formation of new slag is avoided. As soon as the secondary furnace has been drawn off it may be partially charged again immediately with scrap or other low grade material. Even cast iron borings may be used in moderate quantities. The essential feature of the invention however is that by partially refining the charge in the primary furnace, then drawing off the charge and transferring a portion of it to the secondary furnace for the completion of the refining operation and returning a sufficient portion of the molten metal from the primary furnace to said furnace to form a molten bath for the next charge of low grade material, I avoid the necessity for the use of pig iron or any high grade material to furnish the necessary amount of carbon and produce a high grade steel from a low grade material. The operation at the secondary furnace is greatly hastened by the addition of the charge of molten metal from the primary furnace. As the charge in the secondary furnace is already in a suitable condition, the more or less violent reaction produced by the charge of molten metal from the primary furnace will remove the impurities very rapidly.

I find in practice that furnaces operated by this process produce as much, or more, steel from a charge of low grade material as from an ordinary pig iron and scrap charge, and that the steel so produced is fully equal in physical qualities and chemical composition to steel produced from a pig iron and scrap charge.

Having thus described my invention, I claim:—

1. In the manufacture of open-hearth steel, the process which consists in charging a primary furnace with low grade material of the character described, operating said furnace at a temperature below ordinary steel-making temperatures, partially charging a secondary furnace with low grade material, operating said furnace at ordinary steel-making temperatures, transferring a portion of the charge from the primary furnace to the secondary furnace for the completion of the refining operation and returning a portion of the charge to the primary furnace to form a bath to receive the next charge of low grade material.

2. In the manufacture of open-hearth steel, the process which consists in charging a primary furnace with low grade material of the character described, operating said furnace at a temperature below ordinary steel-making temperatures, partially charging a secondary furnace with scrap and flux, operating said furnace at ordinary steel-making temperatures, transferring a portion of the charge from the primary furnace to the secondary furnace for the completion of the refining operation, and returning a portion of the charge to the primary furnace to form a bath to receive the next charge of low grade material.

3. In the manufacture of open-hearth steel, the process which consists in charging a primary furnace with low grade material of the character described, operating said furnace at a temperature below ordinary steel-making temperatures, partially charging a secondary furnace with low grade material and flux, operating said furnace at ordinary steel-making temperatures, tapping the primary furnace into a ladle, delivering a portion of said charge to the secondary furnace for the completion of the refining operation, delivering the remainder of said charge to the primary furnace and re-charging the primary furnace with low grade material.

4. In the manufacture of open-hearth steel, the process which consists in charging a primary furnace with low grade material of the character described, operating said furnace at a temperature below ordinary steel-making temperatures, partially charging a secondary furnace with low grade material and flux, operating said furnace at ordinary steel-making temperatures, tapping a portion of the charge in the primary furnace into a ladle and transferring a portion of said charge to the secondary furnace, returning a portion of said charge to the primary furnace and re-charging the primary furnace with low grade material and with slag from the secondary furnace.

In testimony whereof I affix my signature in presence of two witnesses.

WILLIAM R. PALMER.

Witnesses:
A. M. WOOSTER,
S. W. ATHERTON.